US006421110B1

United States Patent
Yakawa

(10) Patent No.: US 6,421,110 B1
(45) Date of Patent: Jul. 16, 2002

(54) DIGITAL EXPOSURE TYPE PHOTO PROCESSING APPARATUS

(75) Inventor: Yasuhiro Yakawa, Wakayama (JP)

(73) Assignee: Noritsu Koki Co., Ltd., Wakayama (JP)

( * ) Notice: Subject to any disclaimer, the term of this patent is extended or adjusted under 35 U.S.C. 154(b) by 0 days.

(21) Appl. No.: 09/551,355

(22) Filed: Apr. 18, 2000

(30) Foreign Application Priority Data

Apr. 21, 1999 (JP) .......................................... 11-113306

(51) Int. Cl.[7] .......................... G03B 27/52; H04N 1/21
(52) U.S. Cl. .......................... 355/41; 355/40; 358/302
(58) Field of Search ........................... 355/41, 40, 32, 355/52; 358/302; 382/162

(56) References Cited

U.S. PATENT DOCUMENTS

| 5,745,252 A | 4/1998 | Rauh et al. |
| 5,889,578 A | 3/1999 | Jamzadeh |
| 5,995,197 A | * 11/1999 | Yoshino ........................ 355/41 |

FOREIGN PATENT DOCUMENTS

| EP | 0844782 | 5/1998 |
| EP | 0892303 | 1/1999 |
| JP | 9224189 | 8/1997 |
| JP | 10112785 | 4/1998 |

OTHER PUBLICATIONS

Patent Abst. of Japan. — JP 10133288.

* cited by examiner

Primary Examiner—Russell Adams
Assistant Examiner—Peter B. Kim
(74) Attorney, Agent, or Firm—Fulbright & Jaworski L.L.P.

(57) ABSTRACT

A digital exposure type photo processing apparatus having an illuminating optical system (30) for emitting light to a film (1), a photoelectric converter (50) for reading light transmitted through the film and converting the light into image data, an image processing device (60) for processing the image data to generate print data, and a digital printer (4) for exposing photographic paper based on the print data. The photoelectric converter (50) reads the transmitted light in a size larger than each image frame of said film, and converts the light into image data. The image processing device (60) includes an actual image extractor (62) for dividing the image data into actual image data corresponding to the image frame, and peripheral image data corresponding to regions around the image frame. The print data is generated from the actual image data so obtained.

3 Claims, 5 Drawing Sheets

Fig.3A
Fig.3B
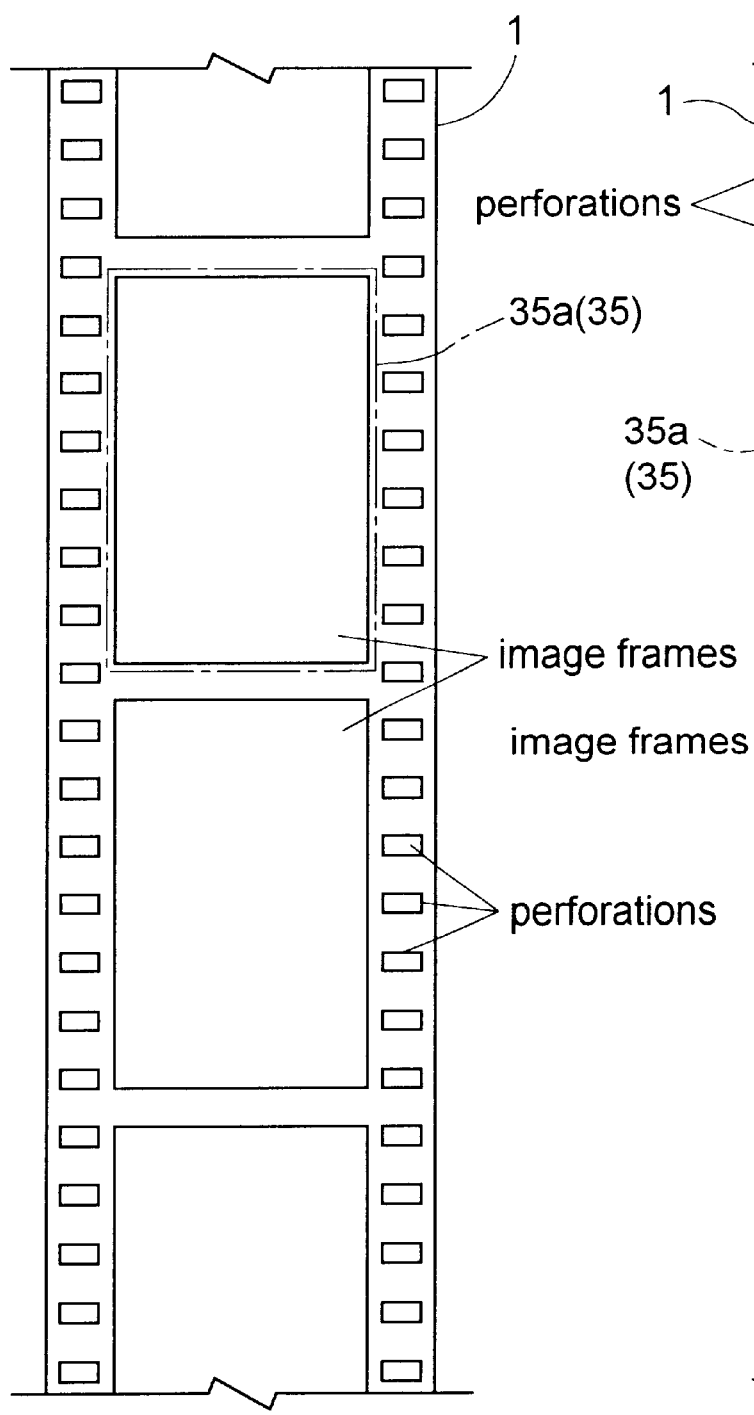
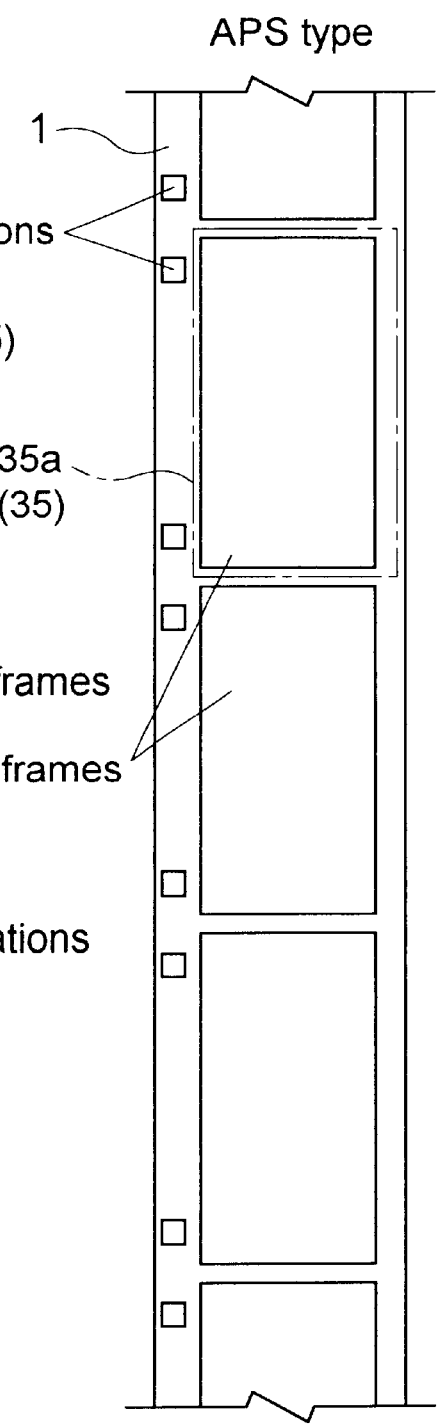

DIGITAL EXPOSURE TYPE PHOTO PROCESSING APPARATUS

BACKGROUND OF THE INVENTION

1. Field of the Invention

This invention relates to a digital exposure type photo processing apparatus having an illuminating optical system for radiating films with illuminating light, a photoelectric converter for reading light transmitted through the films and converting the light into image data, and an image processing device for processing the image data to generate print data.

2. Description of the Related Art

The digital exposure type photo processing apparatus is attracting attention in the photographic printing industry today. This type of photo processing apparatus converts frame images of a photographic film into digital image data by means of a film image reading device, instead of exposing the frame images to light. This digital image data is put to a color density adjustment, size changes, image synthesis and so on based on a predetermined algorithm, to produce print data. This print data is used to expose photographic paper with a digital printer, thereby visualizing the frame images on the photographic paper to obtain photographic prints. The digital printer may be any of various types including the optical modulation laser beam exposure type, liquid crystal shutter type, CRT exposure type, and fluorescent beam exposure type. In any case, such a digital printer forms latent dot images by exposing photographic paper after adjusting the irradiating intensity of each of RGB colors according to a density level of each color of the pixels constituting the digital image data. The exposed photographic paper becomes hard copies of original images, i.e. photographic prints, after a developing process.

The digital exposure type photo processing apparatus described above may be regarded as having a construction in which the projection exposure unit of a conventional projection exposure type photo processing apparatus is replaced by a film image reading device and a digital printer. That is, in the projection exposure type, photographic paper is exposed directly by light emitted from the illuminating optical system and transmitted through a film. In the digital exposure type, light transmitted through a film is once converted into image data by a photoelectric converter, and print data generated from the image data is used to drive the digital printer to expose photographic paper. However, the digital exposure type and projection exposure type, although different in using directly or indirectly the light transmitted through the film, are not very different in the basic technical concept of acquiring visible photographic prints by printing film images on photographic paper.

Photographic prints are of poor quality when, for example, the prints include peripheries of image frames acting as image pickup regions. Trimming such unwanted parts from the prints afterward is a very troublesome operation. Thus, a film mask with an aperture size slightly smaller than the size of the image frames is normally used so that light from peripheries of the image frames may be excluded from the transmitted light. Such a film mask, while providing an advantage that photographic prints include no blanks printed thereon, fails to allow images formed to the very edges of the image frames to be printed completely. The customer is likely to make a complaint when an omitted part of the image is a part of the main photographic object.

SUMMARY OF THE INVENTION

Having regard to the state of the art noted above, an object of this invention is to provide a digital exposure type photo processing apparatus for simply and reliably printing only photographed film images on photographic paper.

The above object is fulfilled, according to this invention, by a digital exposure type photo processing apparatus comprising an illuminating optical system for emitting light to a film; a photoelectric converter for reading light transmitted through the film and converting the light into image data, the transmitted light being read in a size larger than each image frame of the film; and an image processing device for processing the image data, the image processing device including an actual image extractor for dividing the image data into actual image data corresponding to the image frame, and peripheral image data corresponding to regions around the image frame, print data being generated from the actual image data for application to a digital printer.

With this construction, the image data acquired by the photoelectric converter includes data of the peripheries of the image frame as well. Thus, each photographic image is acquired in full. Next, the image data is divided, based on density level and density distribution characteristics, into actual image data representing the frame image corresponding to an exposed region of the film, and peripheral image data representing regions around the image frame corresponding to unexposed regions of the film. Print data is produced from the actual image data. Consequently, the print data made includes the entire photographic image corresponding to the exposed region of the film, and excludes the peripheral image corresponding to the unwanted, unexposed regions. A photographic print made by a digital printer shows only a visualized photographic image itself.

Where, for example, fireworks in the night sky are photographed, there occurs little difference in density level and density distribution between actual image data and peripheral image data. It is difficult to distinguish therebetween automatically. To solve such a problem, the digital exposure type photo processing apparatus in one preferred embodiment of this invention further comprises a video processor for displaying the actual image data and the peripheral image data on a monitor, a manually operable input device, and a boundary corrector operable in response to an instruction received from the input device for correcting a boundary between the actual image data and the peripheral image data. That is, the actual image data and peripheral image data are displayed on the monitor, and the operator, while looking at its display screen, can determine a boundary between the actual image data and the peripheral image data. By successively displaying all frame images, the operator may check all the images even before exposing photographic paper, thereby to improve the quality of photographic prints. To facilitate the operation by the operator to determine a boundary between the actual image data and the peripheral image data, it will be of advantage to display a frame on the monitor which the operator may move up and down and right and left. For the same purpose, the peripheral image data may be displayed in a single color, such as black or gray, to facilitate its distinction from the actual image data.

Further, in a preferred embodiment of this invention, apertures of a film mask for determining regions of the film illuminated by the light are set to be larger than a width of standard image frames, and to be inwardly of film perforations, with respect to a direction of width of the film. With this construction, light of an area larger than each image frame but not extending to the film perforations enters the reading portion of the photoelectric converter usually formed of CCDs. The illuminating light of high intensity having passed through the perforations and entering the photoelectric converter as it is would adversely affect a photoelectric conversion of other regions. The above film mask is effective to avoid such an inconvenience, and also avoid a deficiency of image data of the photographed, exposed regions of the film. Where the film to be read is the APS type having film perforations arranged along only one side thereof, the apertures are set to be larger than the width of standard image frames, and to be inwardly of the film perforations and the opposite edge of the film, with respect to the direction of width of the film.

Other features and advantages of this invention will be apparent from the following description of the embodiments to be taken with reference to the drawings.

BRIEF DESCRIPTION OF THE DRAWINGS

FIGS. 3A and 3B are explanatory views showing a size relationship between image frames of films and apertures of film masks;

DESCRIPTION OF THE PREFERRED EMBODIMENTS

Figure 1:
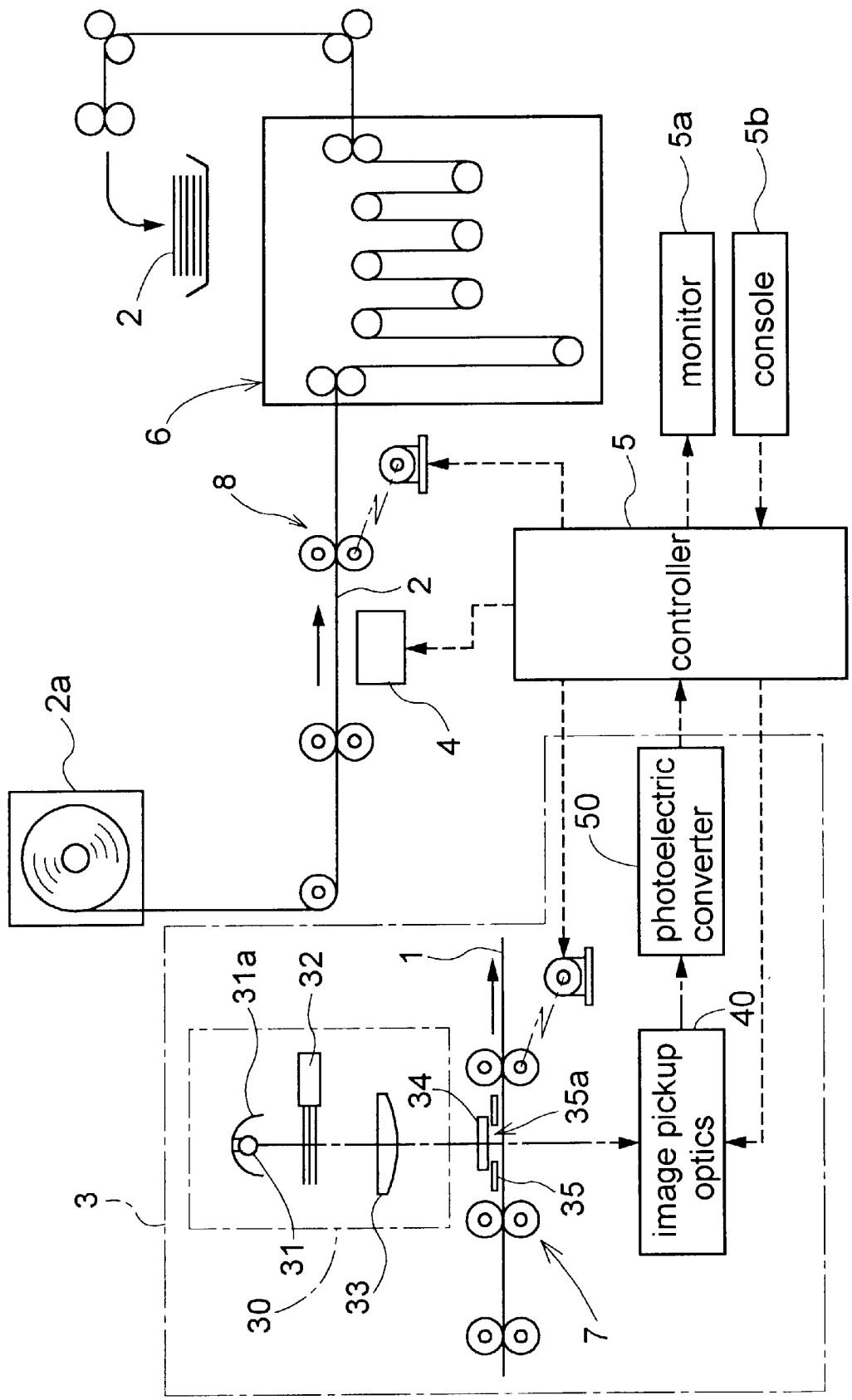
FIG. 1 is a schematic block diagram of a digital exposure type photo processing apparatus in one embodiment of this invention.

FIG. 1 shows a block diagram of an entire digital exposure type photo processing apparatus according to this invention. This photo processing apparatus includes a film scanner 3 for acquiring, as digital image data, photographic frame images of a photographic film (hereinafter simply called the film) 1 developed by a film developing machine not shown, a controller 5 for processing the digital image data acquired to make print data, a digital printer 4 for exposing images corresponding to the frame images on photographic paper 2 based on the print data, and a developing unit 6 for developing the exposed photographic paper 2. The photographic paper 2 developed by the developing unit 6 goes through a drying process to be discharged as photographic prints.

The photographic paper 2 is stored in a roll form in a paper magazine 2a. The paper 2 is cut by a cutter, not shown, to a proper length according to a print size, and transmitted to an exposure point. Alternatively, the paper 2 may be cut to the print size after the exposing and developing processes.

Figure 2:
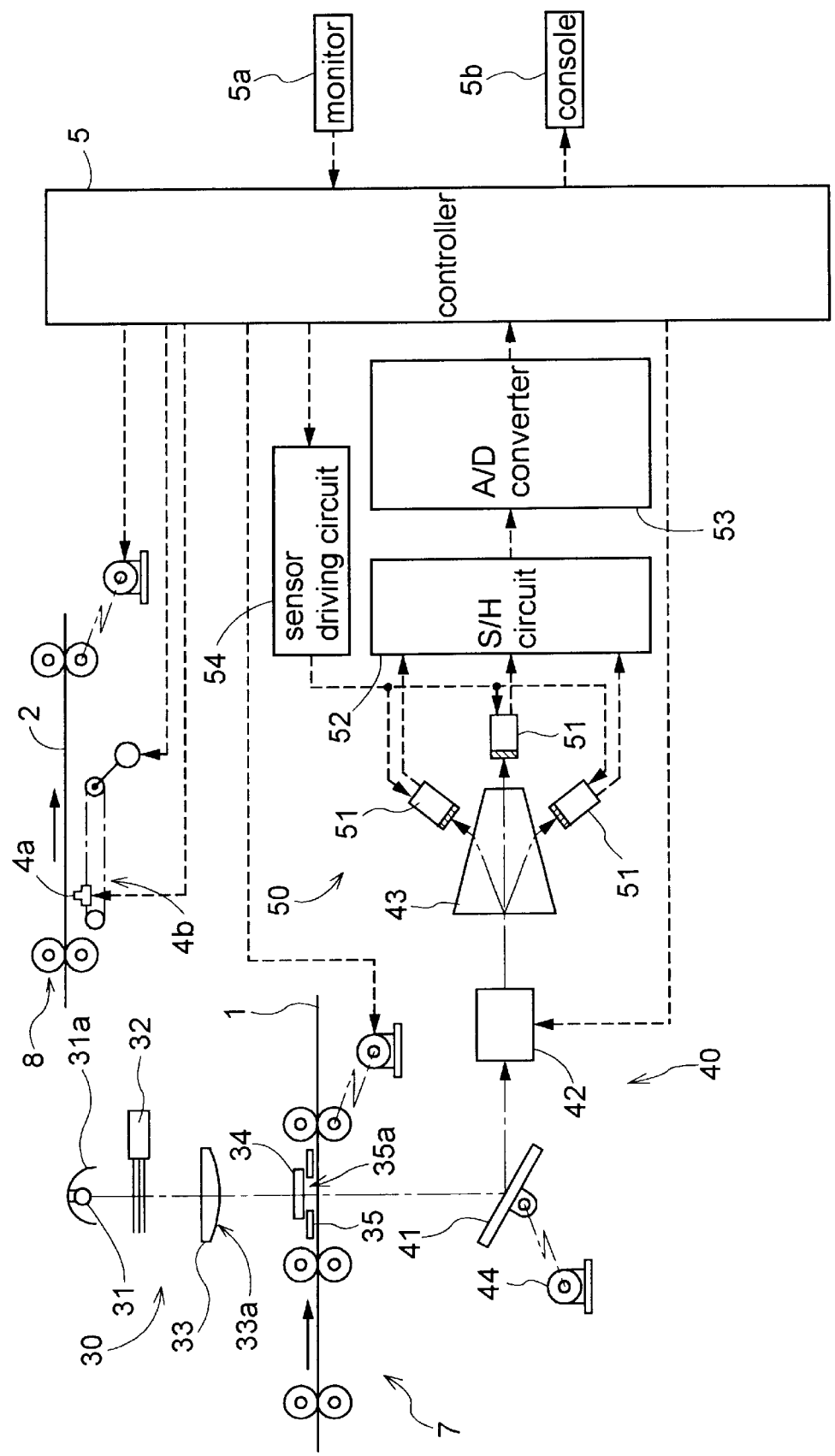
FIG. 2 is a block diagram of a film scanner and a digital printer.

The film scanner 3, in substance, includes an illuminating optical system 30, a film transport mechanism 7, an image pickup optical system 40 and a photoelectric converter 50. As shown in FIG. 2, the illuminating optical system 30 includes a halogen lamp 31 with a reflector 31a, a light adjustment filter 32, a condenser lens 33, a diffuser plate 34 and a film mask 35, the last two being disposed just short of film 1. A light beam from the light source is adjusted in respect of color distribution and intensity distribution, and passes through apertures 35a in the film mask 35 to irradiate the frame images of film 1.

The apertures 35a of film mask 35 and the image frames of film 1 are in a relationship as illustrated in FIGS. 3A and 3B. For a film, such as 135 type, having perforations along opposite sides thereof, as shown in FIG. 3A, the apertures 35a have a larger width than standard image frames, but smaller than the width between the rows of perforations. For a film, such as the APS type, having perforation only along one side thereof, as shown in FIG. 3B, the apertures 35a have a larger width than standard image frames, but smaller than the width between the perforations and the opposite edge of film 1. The length (distance in the longitudinal direction of the film) of each aperture 35a is slightly larger than the length of each standard image frame of either film type. By scanning the film 1 with light passing through these apertures 35a, the film scanner 3 reads not only the image frames but also peripheral regions thereof.

The image pickup optical system 40 for processing the light beam transmitted through the film 2 includes a pivoting mirror 41 for sub-scanning, a lens unit 42, and a prism 43 for diffracting the light beam emerging from the lens unit 42 in three directions. The pivoting mirror 41 is supported such that the reflecting surface thereof is tiltable. As the reflecting surface is tilted by a pivoting motor 44, the film 1 is scanned in a sub-scanning direction, i.e. in the longitudinal direction of film 1, at a predetermined scanning speed. The photoelectric converter 50 converts the light beams received from the image pickup optical system 40 into charge images acting as slit images. The converter 50 includes a CCD sensor unit 51, a sample holding (S/H) circuit 52, an analog-to-digital converter 53 and a sensor driving circuit 54. The CCD sensor unit 51 includes three CCD sensors for separately receiving the three light beams diffracted by the prism 43. Each CCD sensor is a line sensor having a multiplicity of (e.g. 5000) CCD elements arranged in a main scanning direction, i.e. transversely of film 1. These CCD sensors store charges in a charge accumulating time for main scanning under control of the sensor driving circuit 54. Each CCD sensor has a color filter mounted on an image pickup surface thereof for passing only blue components, red components or green components of the light beams to perform a photoelectric conversion of the blue components, red components or green components. The sample holding circuit 52 sample-holds pixel signals outputted from the respective CCD sensors, and generates an image signal with the pixel signals in continuation. The analog-to-digital converter 53 converts each pixel signal constituting the image signal into a digital signal with a predetermined number of bits (e.g. 12 bits).

The film transport mechanism 7 has a roller conveyer unit for successively transporting the image frames of film 1 to an optical axis point of film scanner 3. Once attached to the main body of a printer/processor unit, the transport mechanism 7 is controlled by the controller 5.

When the film 1 is set to a predetermined scan position, an operation is started to read the images from the film 1. As the pivoting motor 44 drives the pivoting mirror 41 from a start position to varied tilt angles at predetermined points of time, the transmitted light images of the film images are successively read by the CCD sensor unit 51 as divided into a plurality of slit images. That is, each CCD sensor is driven by the sensor driving circuit 54 based on a control signal from the controller 5, to perform an image pickup operation and an image signal output operation synchronously with this sub-scanning timing. As a result, each frame image is photoelectrically converted into image signals of RGB color components, and transmitted as image data to the controller 5. Such operations of the illuminating optical system 30, image pickup optical system 40 and photoelectric converter 50 of the film scanner 3 are controlled by the controller 5. The image data acquired, as particularly described hereinafter, is put to various image processing, and divided into actual image data corresponding to the image read from each image frame region and peripheral image data corresponding to the image read from regions around the image frame. Print data for the digital printer 4 is generated from this actual image data.

The digital printer 4 employs the fluorescent beam mode. The fluorescent print head 4a thereof includes a red light emitting block (with red color filters), a green light emitting block (with green color filters) and a blue light emitting block (with blue color filters). Each block is in the form of a linear array of fluorescent elements each with a lens and a color filter attached to a fluorescent substance whose light emission is controlled by grid voltage adjustment. Further, a reciprocating mechanism 4b is provided for moving this fluorescent print head 4a along the transport direction of photographic paper 2.

Numeral 8 denotes a paper transport mechanism operable under control of controller 5 for drawing the photographic paper 2 from the paper magazine 2a and feeding it to the digital printer 4 and developing unit 6. The photographic paper 2 drawn out of the paper magazine 2a is cut before or after a developing process to provide finished prints each having one photographic image output.

Figure 4:
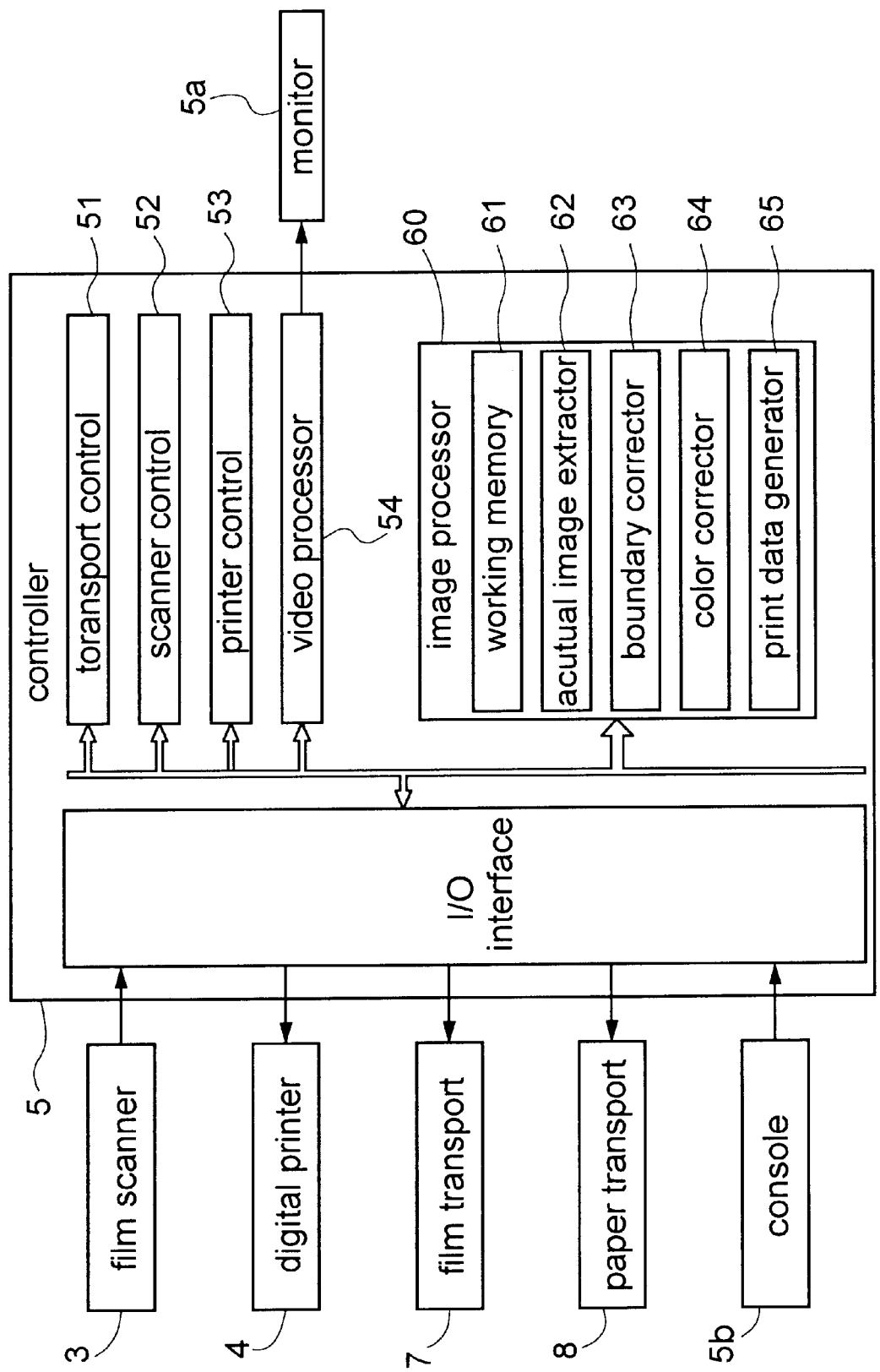
FIG. 4 is a block diagram showing functions of a controller.

The controller 5 has, connected thereto, a monitor 5a for displaying various processing information, and a console 5b acting as a manual input device for inputting various processing instructions. The controller 5 has, as a core element thereof, a microcomputer system including a CPU, ROM, RAM and I/F circuits. The various functions described above, which are necessary to this digital exposure type photo processing apparatus, are achieved by hardware and/or software. In particular, the functional elements important in describing this invention include, as shown in FIG. 4, a transport control 51 for controlling the film transport mechanism 7 and paper transport mechanism 8, a scanner control 52 for controlling the film scanner 3, an image processing device 60 for generating print data by performing various image processing on the image data acquired by the film scanner 3, such as white balancing, negative-positive reversal, outline enhancement and so on, a printer control 53 for driving the digital printer 4 based on print data, and a video processor 54 for generating video signals for displaying the image data processed by the image processing device 60 on the monitor 5a.

The image processing device 60 includes functional units such as a working memory 61, an actual image extractor 62, a boundary corrector 63, a color corrector 64 and a print data generator 65. Besides, the image processing device 60 has processing functions to perform on image data, such as white balancing, negative-positive reversal and outline enhancement. The image data acquired by the film scanner 3 is stored in the working memory 61. The actual image extractor 62 divides the image data into actual image data representing each frame image corresponding to an exposed region of film 1, and peripheral image data representing peripheries around the frame image and corresponding to unexposed regions of film 1. That is, the actual image extractor 62 is operable, following a predetermined algorithm, to determine peripheral image data from RGB density levels and density distribution of each pixel forming the image data, and holds addresses of the actual image data and addresses of the peripheral image data. This dividing algorithm itself is well known. The division may be made by utilizing the fact that the exposed and unexposed regions of film 1 usually are clearly different in density level (the unexposed region often being called a blank area which is nearly transparent). Where there is little difference in density level between the exposed and unexposed regions (e.g. of a film having photographs of night scenes), density hardly varies in the unexposed region but does vary, though slightly, in the exposed region (e.g. a photograph of the night sky) which is detectable. The division may be made by using this difference. That is, the extraction of actual image data is basically possible based on a difference in the density distribution (in other words, spatial frequency) of each pixel between the exposed and unexposed regions. Where density distribution hardly serves to distinguish between the two different regions, the actual image region may be determined by applying, as an extraction window, the size of an actual image region definitely obtained from another image frame, to the image data from which an actual image is to be extracted.

The color corrector 64 has a function to correct RGB density levels of image data to realize optimal color reproducibility according to the types of film 1 and photographic paper 2. In addition, the color corrector 64 has a function to apply a particular color to the peripheral image data for enabling the operator to check on the monitor 5a the division of image data made by the actual image extractor 62. This particular color, preferably, is one that enhances color tones of actual image data, or a gray having a distinct difference in brightness to the actual image data. Once a color is determined, the color corrector 64 accesses the actual image extractor 62, receives the addresses of peripheral image data, and rewrites the peripheral image data.

Figure 5A:
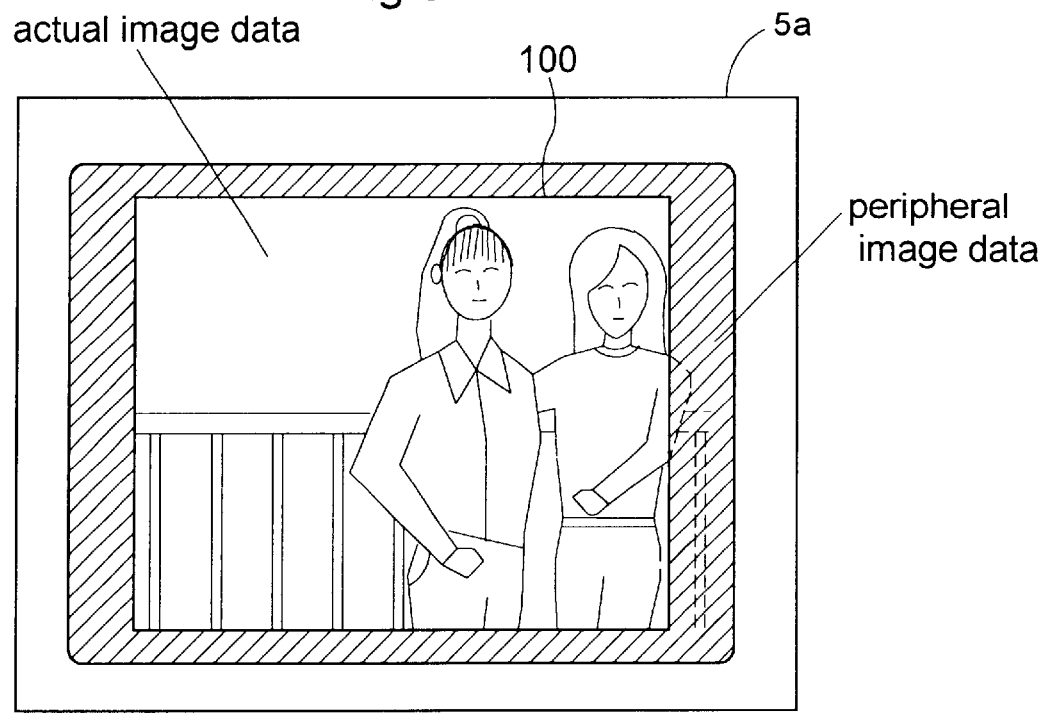
FIG. 5 is an explanatory view of a monitor screen.
Figure 5B:
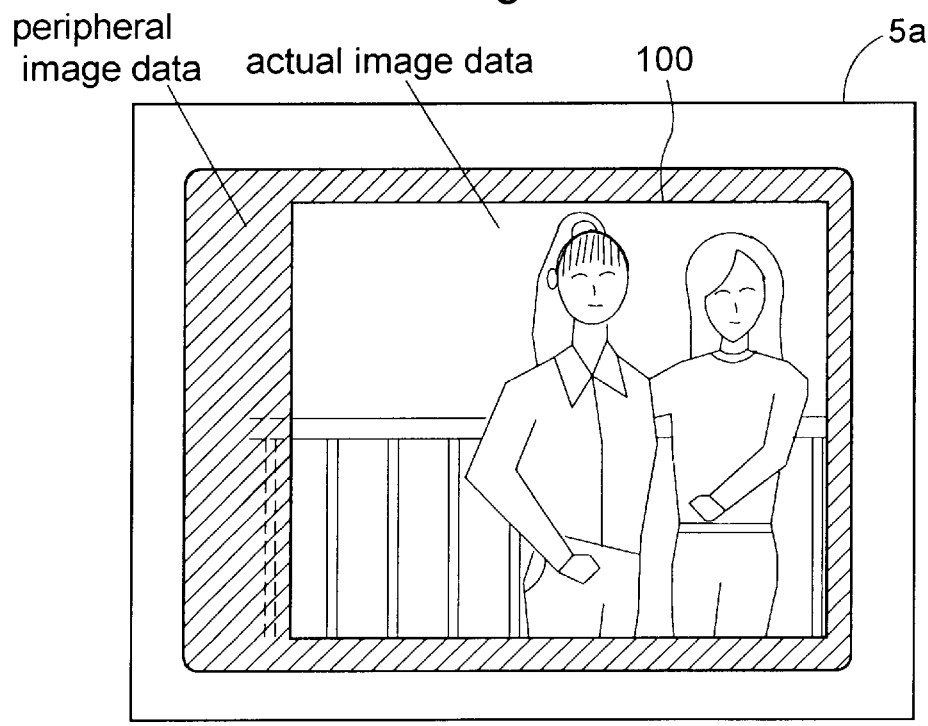

The video processor 54 displays, on the monitor 5a, a picture formed of actual image data and peripheral image data as shown in FIG. 5. The operator looks at this monitor screen and checks whether the actual image region is correct. When changing the actual image region, the operator causes a frame 100 indicating a boundary of image data to be generated as print data to be displayed on the monitor 5a, and moves the frame 100 to an appropriate position and confirm the change by using a mouse which is a component of console 5b. The position data of frame 100 is transmitted to the boundary corrector 63. Based on the frame position data, the boundary corrector 63 changes the addresses of the actual image data and addresses of the peripheral image data. Thus, in this embodiment, the boundary corrector 63 acts as the boundary correcting device, and the mouse as the input device.

When the above checking operation is completed, the print data generator 65 accesses the working memory 61 by using the addresses of actual image data, reads the actual image data, changes the image size as necessary, generates print data for the digital printer 4, and transmits the print data to the printer control 53. The digital printer 4 exposes on the photographic paper 2 the image based on the actual image data under control of the printer control 53. The exposed photographic paper 2 is developed by the developing unit 6, and discharged as a photographic print.

Other Embodiment

In the above embodiment, the pivoting mirror 41 is driven to scan the frame images of film 1 in the sub-scanning direction. With this mirror 41 fixed, the frame images may be scanned by moving the film 1 in the sub-scanning direction. In this case, the apertures 35a of film mask 35 are in the form of elongated slits extending in the main scanning direction (i.e. transversely of the film). Here again, the relationship between the apertures 35a of film mask 35 and the image frames of film 1 is such that the length of the slits acting as apertures 35a is larger than the width of standard image frames. By scanning the film 1 with light passing through the slits 35*a,* the film scanner 3 reads not only the image frames of film 1 but regions around the image frames.

What is claimed is:

1. A digital exposure type photo processing apparatus comprising;

an illuminating optical system for emitting light to a film;

a photoelectric converter for reading light transmitted through said film and converting the light into image data, said transmitted light being read in a size larger than each image frame of said film;

image processing means for processing said image data to generate print data, said image processing means comprising:

an actual image extractor for dividing said image data into actual image data corresponding to said image frame, and peripheral image data corresponding to regions around said image frame; and a print data generator for generating said print data from said actual image data;

a video processor for displaying said actual image data and said peripheral image data on a monitor;

manually operable input means;

a boundary corrector operable in response to an instruction received from said input means for correcting a boundary between said actual image data and said peripheral image data; and a digital printer for exposing photographic paper based on said print data.

2. The digital exposure type photo processing apparatus of claim 1, wherein said video processor displays said peripheral image data in a single color.

3. The digital exposure type photo processing apparatus of claim 1, wherein apertures of a film mask for determining regions of said film illuminated by said light are set to be larger than a width of standard image frames, and to be inwardly of film perforations, with respect to a direction of width of said film.

* * * * *